US009525187B2

(12) United States Patent
Tsubosaka et al.

(10) Patent No.: US 9,525,187 B2
(45) Date of Patent: Dec. 20, 2016

(54) GAS DIFFUSION LAYER FOR FUEL CELL, FUEL CELL, AND METHOD OF MANUFACTURING GAS DIFFUSION LAYER FOR FUEL CELL

(71) Applicants: Kenji Tsubosaka, Toyota (JP); Riri Fujito, Kariya (JP); Kenta Fujii, Kariya (JP)

(72) Inventors: Kenji Tsubosaka, Toyota (JP); Riri Fujito, Kariya (JP); Kenta Fujii, Kariya (JP)

(73) Assignees: TOYOTA JIDOSHA KABUSHIKI KAISHA, Toyota-Shi (JP); TOYOTA BOSHOKU KABUSHIKI KAISHA, Kariya-Shi (JP)

( * ) Notice: Subject to any disclaimer, the term of this patent is extended or adjusted under 35 U.S.C. 154(b) by 113 days.

(21) Appl. No.: 14/377,232

(22) PCT Filed: Jan. 31, 2013

(86) PCT No.: PCT/IB2013/000123
§ 371 (c)(1),
(2) Date: Aug. 7, 2014

(87) PCT Pub. No.: WO2013/117974
PCT Pub. Date: Aug. 15, 2013

(65) Prior Publication Data
US 2016/0013503 A1    Jan. 14, 2016

(30) Foreign Application Priority Data

Feb. 8, 2012   (JP) ................................. 2012-024714

(51) Int. Cl.
*H01M 4/88*     (2006.01)
*H01M 8/10*     (2016.01)
(Continued)

(52) U.S. Cl.
CPC ......... *H01M 8/1004* (2013.01); *H01M 4/8605* (2013.01); *H01M 4/8807* (2013.01);
(Continued)

(58) Field of Classification Search
None
See application file for complete search history.

(56) References Cited

U.S. PATENT DOCUMENTS 6,416,896 B1 * 7/2002 Tamaru ............... H01M 4/8605
429/534
2002/0100725 A1    8/2002 Lee et al.
(Continued)

FOREIGN PATENT DOCUMENTS

CA         2480342 A1     10/2003
JP         62-177221 A     8/1987
(Continued)

OTHER PUBLICATIONS

Kim et al. (Small 2007, 3, No. 1, 91-95) (Jan. 2007).*

*Primary Examiner* — Carlos Barcena
*Assistant Examiner* — Wojciech Haske
(74) *Attorney, Agent, or Firm* — Andrews Kurth Kenyon LLP

(57) ABSTRACT

Gas diffusion layers, that is, an anode-side gas diffusion layer and a cathode-side gas diffusion layer that are attached to an MEA have irregularities on fiber surfaces of carbon fibers deposited in a layer thickness direction. These irregularities on the fiber surfaces are formed when the fibers are extruded from an extrusion nozzle to be spun.

9 Claims, 14 Drawing Sheets

(51) Int. Cl.
  *H01M 4/86* (2006.01)
  *H01M 8/02* (2016.01)
  *H01M 4/96* (2006.01)
(52) U.S. Cl.
  CPC .......... *H01M 4/8817* (2013.01); *H01M 4/96* (2013.01); *H01M 8/0234* (2013.01); *Y02E 60/50* (2013.01); *Y02P 70/56* (2015.11)

(56) References Cited

U.S. PATENT DOCUMENTS

| | | |
|---|---|---|
| 2004/0170886 A1 | 9/2004 | Sakamoto |
| 2007/0122687 A1 | 5/2007 | Sakurai et al. |
| 2010/0219069 A1 | 9/2010 | Wagner et al. |
| 2012/0214375 A1 | 8/2012 | Kitano et al. |

FOREIGN PATENT DOCUMENTS

| | | | |
|---|---|---|---|
| JP | 01-282325 | A | 11/1989 |
| JP | 2002-249966 | A | 9/2002 |
| JP | 2002-327355 | A | 11/2002 |
| JP | 2009-079346 | A | 4/2009 |
| JP | 2009-152128 | A | 7/2009 |
| JP | 2012-167400 | A | 9/2012 |
| WO | 2005/043656 | A1 | 5/2005 |
| WO | 2011/089754 | A1 | 7/2011 |

\* cited by examiner

ENLARGEMENT OF FIBER FUSED PORTIONS

COMPARATIVE EXAMPLE

EMBODIMENT

COMPARATIVE EXAMPLE

EMBODIMENT

FIG. 12
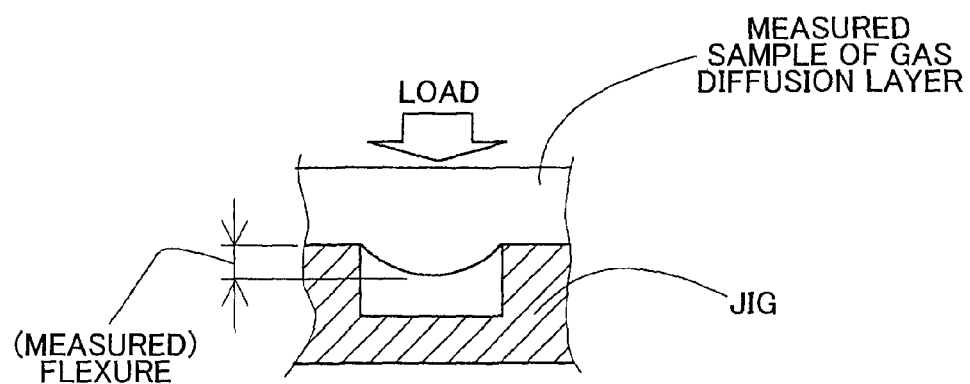
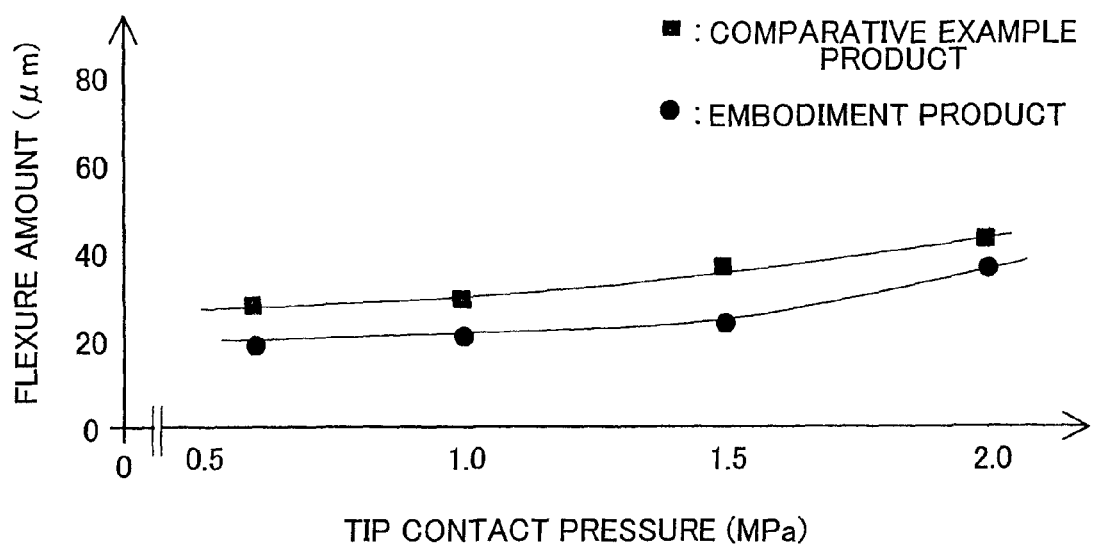

F I G. 13A
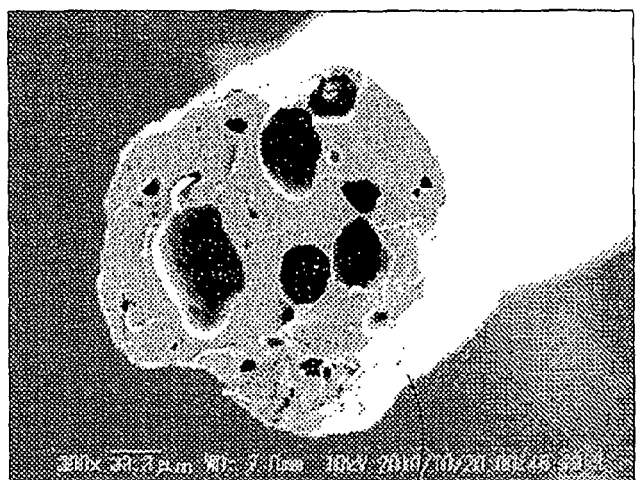
CF(PFc)
F I G. 13B
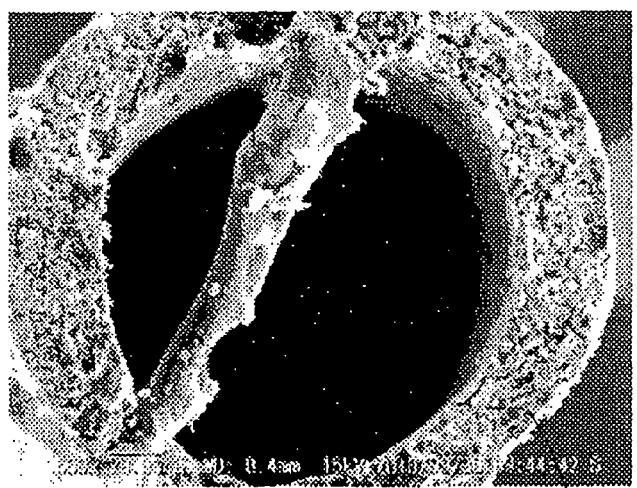
CF(PFc)

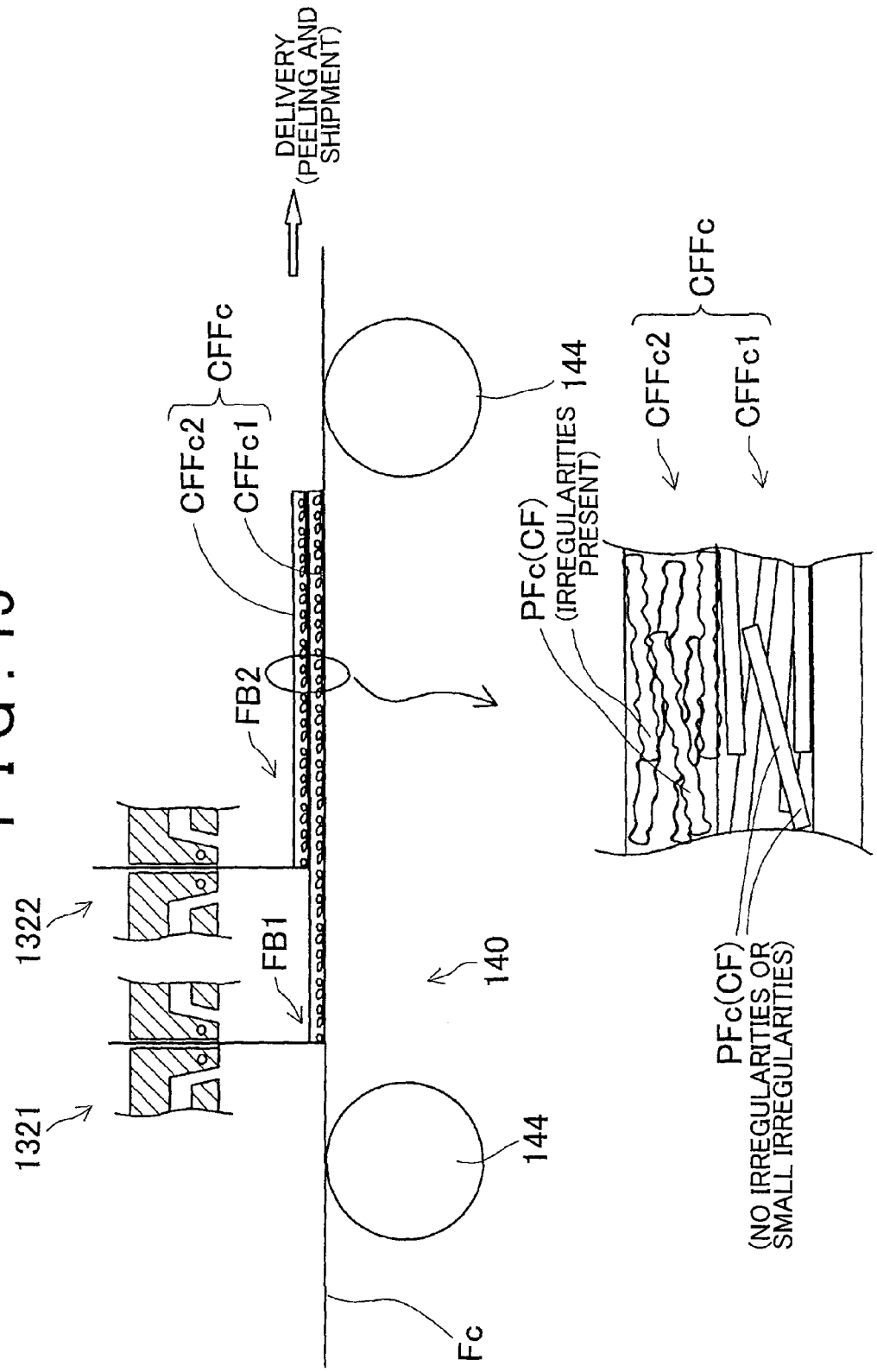

GAS DIFFUSION LAYER FOR FUEL CELL, FUEL CELL, AND METHOD OF MANUFACTURING GAS DIFFUSION LAYER FOR FUEL CELL

CROSS-REFERENCE TO RELATED APPLICATIONS

This is a national phase application based on the PCT International Patent Application No. PCT/IB2013/000123 filed Jan. 31, 2013, claiming priority to Japanese patent application No. 2012-024714 filed Feb. 8, 2012, the entire contents of both of which are incorporated herein by reference.

BACKGROUND OF THE INVENTION

1. Field of the Invention

The invention relates to a gas diffusion layer for a fuel cell, a fuel cell employing this gas diffusion layer, and a method of manufacturing a gas diffusion layer for a fuel cell.

2. Description of Related Art

A fuel cell is equipped with a membrane electrode assembly (an MEA) that is obtained by attaching both electrodes, namely, an anode and a cathode to both faces of an electrolyte membrane (e.g., a solid polymer membrane) having proton conductivity respectively. After both the electrodes of this MEA are supplied with fuel gas and oxidizing gas, for example, hydrogen gas and air via a gas diffusion layer, this fuel cell generates electric power through an electrochemical reaction of hydrogen and oxygen. The gas diffusion layer is required to exhibit gas permeability and electric conductivity. In recent years, various methods of forming the gas diffusion layer from carbon fibers have been proposed (e.g., Japanese Patent Application Publication No. 2009-152128 (JP-2009-152128 A)).

In general, a fuel cell has a stack structure obtained by laminating fuel battery cells having MEA's sandwiched by gas diffusion layers, and is fastened in the lamination direction. This fastening force acts as a load on the MEA's and gas diffusion layers of the fuel cells. In Japanese Patent Application Publication No. 2009-152128 (JP-2009-152128 A), a gas diffusion layer is imparted with elasticity by using ingenuity for the situation of the binding of carbon fibers forming the gas diffusion layer by resin or the diameter of the fibers. Changes in load and dimension in the lamination direction of the cells are absorbed through this elasticity.

Although changes in load and the like are changed through elasticity, the load in the lamination direction of the cells continues to be applied to the gas diffusion layer. Therefore, there is an apprehension that the settling or creeping of the gas diffusion layer may be incurred. Due to this deformation of the gas diffusion layer, it is also feared that a gas flow channel in the gas diffusion layer may narrow.

SUMMARY OF THE INVENTION

The invention provides a new gas diffusion layer that can maintain a layered configuration thereof or can also maintain gas permeability while restraining the layered configuration thereof from changing.

A first aspect of the invention relates to a gas diffusion layer for a fuel cell. The gas diffusion layer includes carbon fibers, which have irregularities on the fiber surfaces of the carbon fibers, deposited in a layer thickness direction of the gas diffusion layer.

The gas diffusion layer has irregularities on the fiber surfaces of the carbon fibers deposited in the layer thickness direction. In the gas diffusion layer, the carbon fibers are in contact with one another at various spots in the layer. At the spots where the carbon fibers are in contact with one another, the carbon fibers are likely to remain in contact with one another due to the irregularities present on the fiber surfaces. Besides, if the carbon fibers come into contact with one another at irregular spots, the area of contact increases, and the frictional force of the fibers at the spots where the fibers are in contact with one another is enhanced. Thus, even if a force of the gas diffusion layer in the layer thickness direction acts on each of the carbon fibers forming the gas diffusion layer, the carbon fibers that are in contact with one another are unlikely to slip with respect to one another. Even in the case where the carbon fibers are close to one another and come into contact with one another upon receiving the aforementioned force, the carbon fibers become unlikely to slip with respect to one another after having come into contact with one another. As a result, according to the aforementioned gas diffusion layer, the settling or creeping of the gas diffusion layer can be made unlikely to occur. Thus, an advantage is obtained from the standpoint of maintaining the layered configuration of the gas diffusion layer or restraining the layered configuration from changing. In addition, a gas flow channel can also be restrained from narrowing due to the settling or creeping of the gas diffusion layer. Therefore, the permeability of gas can also be maintained or enhanced.

The aforementioned gas diffusion layer can adopt the following modes. For example, the irregularities on the fiber surfaces of the carbon fibers occupying at least one surface layer side of the gas diffusion layer may be smaller in size or smaller in number than the irregularities on the fiber surfaces of the carbon fibers occupying regions other than the surface layer side. Alternatively, the gas diffusion layer may be equipped with a multilayer structure obtained by depositing the carbon fibers into a multiple of layers, that is, three or more layers in the layer thickness direction, and the irregularities on the fiber surfaces of the carbon fibers of an inner layer may be larger in size or larger in number than the irregularities on the fiber surfaces of the carbon fibers of the surface layer. It should be noted herein that the expressions "smaller in number" and "larger in number" mean that the number of irregularities per unit area is smaller and larger respectively. Besides, the expression "smaller in number" includes the absence of irregularities as well. In this manner, the following advantage is obtained.

In a fuel cell, the gas diffusion layer is attached to a membrane electrode assembly obtained by attaching electrodes to both faces of an electrolyte membrane respectively. In this case, in the gas diffusion layer according to each of both the foregoing modes, the number of irregularities on the surfaces of the carbon fibers on the surface layer side that is attached to the membrane electrode assembly is small. Thus, according to the gas diffusion layer of each of the foregoing modes, the electrodes or the electrolyte membrane can be restrained from being mechanically damaged due to the attaching of the irregularities on the surfaces of the carbon fibers to the membrane electrode assembly, so that the durability of the membrane electrode assembly, and hence the durability of the fuel cell can be enhanced.

In addition to being attached to the membrane electrode assembly as described above, the gas diffusion layer is attached, on the other side of the assembly, to a separator as an electrically conductive flow channel member having a flow channel for supplying gas. In the gas diffusion layer of each of both the foregoing modes, the irregularities on the surface layer side attached to this separator are small in size and/or small in number. Therefore, the contact resistance can be restrained from increasing while ensuring contact with the separator. Thus, according to the gas diffusion layer of each of the foregoing modes, it is possible to contribute toward enhancing the power generation capacity of the fuel cell by reducing the resistance of contact with the separator.

Besides, the carbon fibers can be fused to one another at intersecting spots of the fibers. In this manner, the carbon fibers can be restrained through fusion from slipping or being displaced. Therefore, the effectiveness in maintaining the layered configuration of the gas diffusion layer or restraining the layered configuration from changing is enhanced, and the strength of the gas diffusion layer can also be enhanced. Moreover, air gaps in the gas diffusion layer formed of the carbon fibers can be restrained from being greatly reduced as well. Therefore, the diffusivity of gas in the gas diffusion layer and the drainability of produced water can also be ensured, and an advantage is obtained in enhancing the power generation capacity of the fuel cell. In this case, if it is assumed that the aforementioned fusion occurs at ends of the carbon fibers, the ends of the fibers can be prevented from being exposed in a so-called fluffy manner. Therefore, the membrane electrode assembly can also be prevented from being damaged in the case where the gas diffusion layer is attached to the assembly.

Besides, the carbon fibers may be hollow fibers. In this manner, the carbon fibers themselves can exert spring properties for a force acting in a diameter reduction direction. In consequence, according to the gas diffusion layer that is formed of the carbon fibers as hollow fibers, the effectiveness in maintaining the layered configuration of the gas diffusion layer or restraining the layered configuration from changing can be further enhanced. Moreover, since gas and water flow inside the carbon fibers, an advantage is also obtained from the standpoint of ensuring the diffusivity of gas and the drainability of water. In this case, the porosity may be set to 30 to 90%. If the porosity of the hollow fibers is set equal to or higher than 30%, the effectiveness in exerting the aforementioned spring properties and ensuring the diffusivity of gas or the drainability of water is enhanced. Besides, it is desirable to set the porosity equal to or lower than 50% from the standpoint of maintaining the shape of the hollow fibers as well. Furthermore, due to the aforementioned high porosity, high adiabaticity can be exerted by the carbon fibers forming the gas diffusion layer. Therefore, the power generation performance of the fuel cell under a low-temperature environment can be restrained from deteriorating.

A second aspect of the invention relates to a fuel cell that is equipped with a membrane electrode assembly that is obtained by attaching electrodes to both faces of an electrolyte membrane, and a gas diffusion layer that is attached to the membrane electrode assembly.

According to this fuel cell, high power generation capacity can be achieved due to the aforementioned performance of the gas diffusion layer of the fuel cell.

A third aspect of the invention relates to a method of manufacturing a gas diffusion layer for a fuel cell. This manufacturing method includes extruding a solution of a precursor resin of carbon fibers from an extrusion nozzle and spinning the fibers, depositing the spun fibers in the form of a nonwoven fabric to form a diffusion layer intermediate product, infusibilizing the spun fibers, which form the diffusion layer intermediate product, and then graphitizing the fibers, and extruding the solution from the extrusion nozzle to spin the fibers while changing a nozzle temperature of the extrusion nozzle.

According to the aforementioned manufacturing method, when the solution of the precursor resin of the carbon fibers is extruded from the extrusion nozzle to spin the fibers, the solution of the precursor resin of the carbon fibers (hereinafter referred to as a precursor resin solution) is extruded from the extrusion nozzle to spin the fibers while changing the nozzle temperature of the extrusion nozzle. The precursor resin solution actually comes into contact with the extrusion nozzle. Therefore, the nozzle temperature has an influence on the viscosity and softening of the precursor resin solution. Thus, the carbon fibers that have been extruded and spun while changing the nozzle temperature have irregularities on outer surfaces thereof, namely, on fiber surfaces thereof under the influence of the nozzle temperature. In this case, the nozzle temperature is repeatedly raised and lowered within a temperature range whose lower limit exceeding a softening temperature of the resin, that is, a temperature at which the precursor resin starts fusing, whereby irregularities can be highly effectively formed on the surfaces of the extruded and spun fibers. Then, the irregularities are formed on the fiber surfaces as described above, and the spun fibers are deposited in the form of a nonwoven fabric, whereby the diffusion layer intermediate product having the spun fibers, which have irregularities on the fiber surfaces thereof, deposited in the layer thickness direction is formed.

This diffusion layer intermediate product is subjected to an infusibilization treatment for infusibilizing the spun fibers forming this diffusion layer intermediate product, and then is subjected to a graphitization treatment for graphitizing the infusibilized fibers. Due to graphitization of the infusibilized fibers, the diffusion layer intermediate product subjected to the graphitization treatment turns into the gas diffusion layer having the carbon fibers, which have irregularities on the fiber surfaces thereof, deposited in the layer thickness direction. That is, according to the aforementioned manufacturing method, the gas diffusion layer having the carbon fibers, which have irregularities on the fiber surfaces thereof, deposited in the layer thickness direction can be easily manufactured via the extrusion and spinning that are carried out while changing the nozzle temperature. In this case, a carbonization treatment for carbonizing the spun fibers can be carried out prior to the graphitization treatment, and then the graphitization treatment can be carried out.

The aforementioned manufacturing method can adopt the following mode. For example, in an attempt to infusibilize the spun fibers, the spun fibers may be infusibilized at a temperature lower than a temperature at which the precursor resin is completely infusibilized, or in a time shorter than a time in which the precursor resin is completely infusibilized. The infusibilization of the spun fibers is a treatment for preventing the spun fibers from fusing during subsequent graphitization or during both carbonization and graphitization. In the foregoing configuration, due to infusibilization at a low temperature or in a short time, the spun fibers are likely to be infusibilized at spots where heat is likely to concentrate, for example, at intersecting spots of the spun fibers or spots where the ends of the fibers are in contact with the surrounding fibers. Thus, according to the foregoing mode, in the gas diffusion layer that has been obtained via graphitization, the carbon fibers can be fused to one another at the intersecting spots of the carbon fibers or at the fiber ends.

Besides, if the extrusion nozzle is a nozzle for spinning hollow fibers, the gas diffusion layer having the hollow carbon fibers, which are equipped with irregularities on the fiber surfaces thereof, deposited in the layer thickness direction can be easily manufactured.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 12 is an illustrative view showing how the flexibility of a gas diffusion layer is measured, and a graph obtained by plotting the results of the measurement as to the comparative example and the embodiment of the invention;

FIG. 13A includes electron microgram showing an end face of the carbon fiber CF according to a modification example;

FIG. 13B includes electron microgram showing an end face of the carbon fiber CF according to another modification example;

FIG. 15 is an illustrative view showing the process of manufacturing the diffusion layer intermediate product CFFc according to another modification example.

DETAILED DESCRIPTION OF EMBODIMENT

Figure 1:
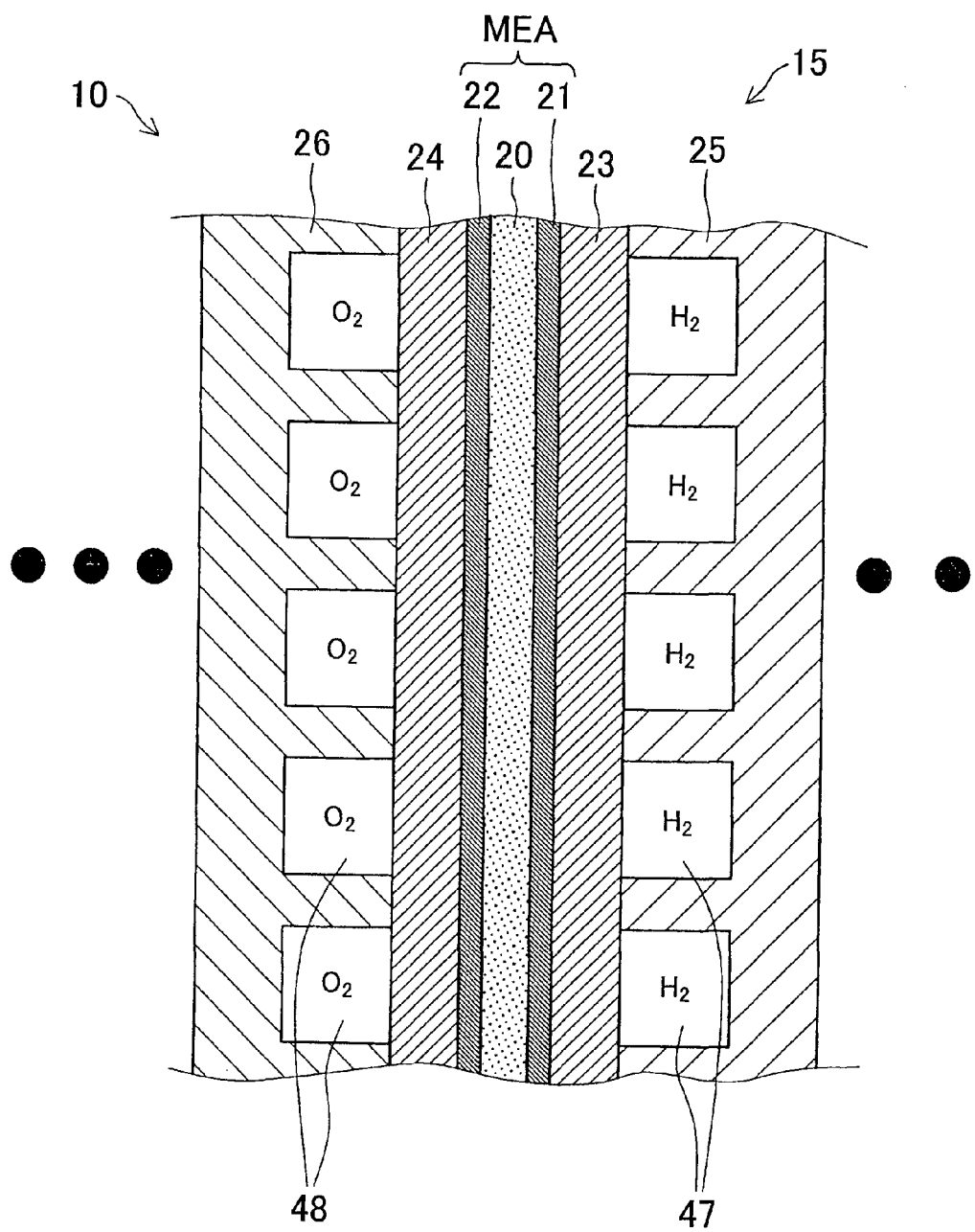
FIG. 1 is an illustrative cross-sectional view schematically showing one of single cells 15 constituting a fuel cell 10 as one embodiment of the invention.

An embodiment thereof will be described on the basis of the drawings. FIG. 1 is an illustrative cross-sectional view schematically showing each of single cells 15 constituting the fuel cell 10 as the embodiment of the invention. The fuel cell 10 of this embodiment of the invention is a proton-exchange membrane fuel cell of a stack structure, which is obtained by laminating a plurality of the single cells 15 configured as shown in FIG. 1.

Each of the single cells 15 is equipped with both electrodes, namely, an anode 21 and a cathode 22 on both sides of an electrolyte membrane 20 respectively. This anode 21 and this cathode 22 are formed on both faces of the electrolyte membrane 20 respectively, and form a membrane electrode assembly (an MEA) in conjunction with the electrolyte membrane 20. Moreover, the single cell 15 is equipped with an anode-side gas diffusion layer 23, a cathode-side gas diffusion layer 24, and gas separators 25 and 26 that sandwich the electrolyte membrane 20, on which the electrodes have been formed, from both sides thereof. Each of the two gas diffusion layers is attached to a corresponding one of the electrodes.

The electrolyte membrane 20 is a proton-conductive ion-exchange membrane formed of a solid polymer material, for example, fluororesin, and exhibits good electric conduction properties in a wet state. The anode 21 and the cathode 22 are equipped with catalysts (e.g., platinum or a platinum alloy), and are formed by having these catalysts supported on electrically conductive carriers (e.g., carbon particles). The anode-side gas diffusion layer 23 and the cathode-side gas diffusion layer 24 are formed by depositing carbon fibers on one another in a layer thickness direction, and have gas permeability and electric conductivity. These two gas diffusion layers, namely, the anode-side gas diffusion layer and the cathode-side gas diffusion layer will be described later in detail, including a manufacturing method thereof.

The gas separator 25 is equipped, on the anode-side gas diffusion layer 23 side, with in-cell fuel gas flow channels 47 through which fuel gas containing hydrogen flows. The gas separator 26 is equipped, on the cathode-side gas diffusion layer 24 side, with in-cell oxidizing gas flow channels 48 through which oxidizing gas containing oxygen (air in this embodiment of the invention) flows. Incidentally, although not shown in the drawings, for example, inter-cell cooling medium flow channels through which a cooling medium flows can be formed between adjacent ones of the single cells 15. These gas separators 25 and 26 are formed of an electrically conductive member impervious to gas, for example, compact carbon made impervious to gas by compressing carbon or calcined carbon, or a metal material such as stainless steel or the like.

Although not shown in FIG. 1, a plurality of hole portions are formed at predetermined positions in the vicinity of outer peripheries of the gas separators 25 and 26. When the gas separators 25 and 26 are laminated together with other members to be assembled into the fuel cell 10, the plurality of these hole portions are superimposed on one another to form a flow channel that penetrates the fuel cell 10 in the lamination direction. That is, the hole portions form a manifold for supplying/discharging fuel gas and oxidizing gas or the cooling medium to/from the in-cell fuel gas flow channels 47 and the in-cell oxidizing gas flow channels 48 or the inter-cell cooling medium flow channels as described above.

In the fuel cell 10 according to this embodiment of the invention, hydrogen gas from the in-cell fuel gas flow channels 47 of the gas separator 25 is supplied to the anode 21 while being diffused in the anode-side gas diffusion layer 23. As regards air, air from the in-cell oxidizing gas flow channels 48 of the gas separator 26 is supplied to the cathode 22 while being diffused in the cathode-side gas diffusion layer 24. Upon being thus supplied with gases, the fuel cell 10 generates electric power, and gives the generated electric power to an external load.

Figure 2:
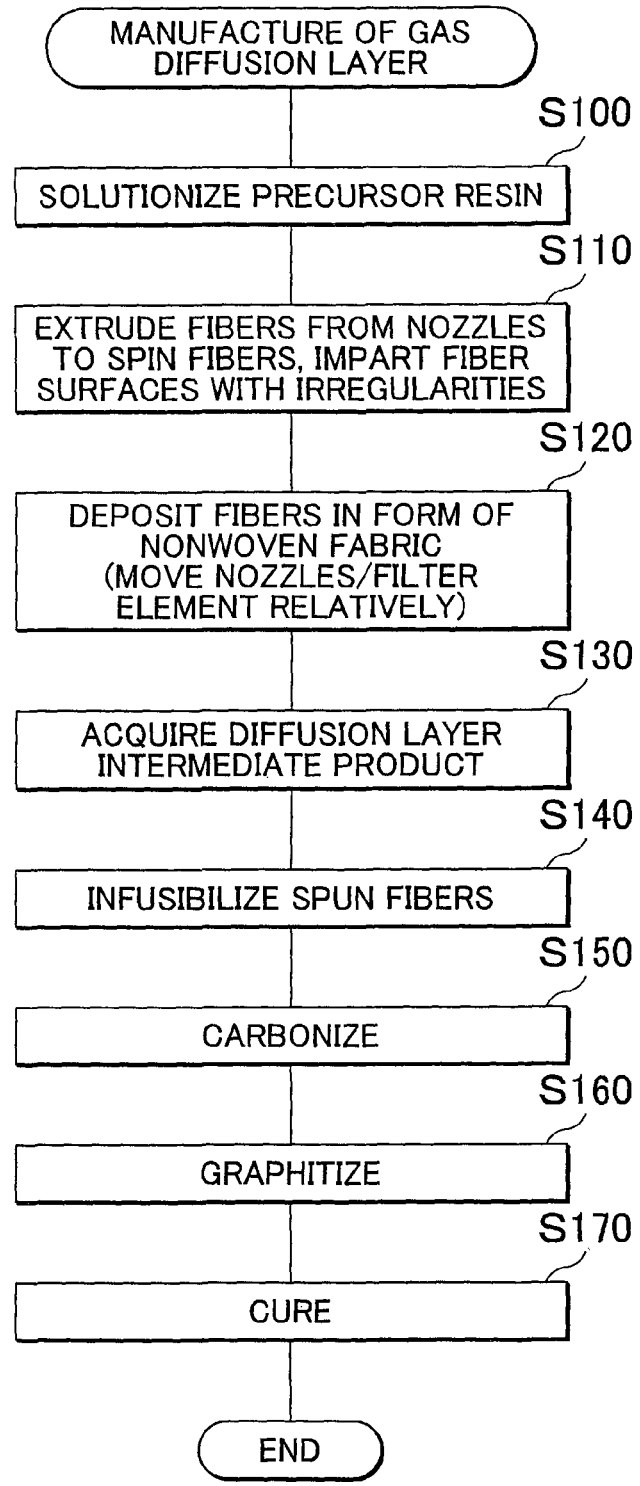
FIG. 2 is a flowchart showing the processing procedure of a method of manufacturing a gas diffusion layer.
Figure 3:
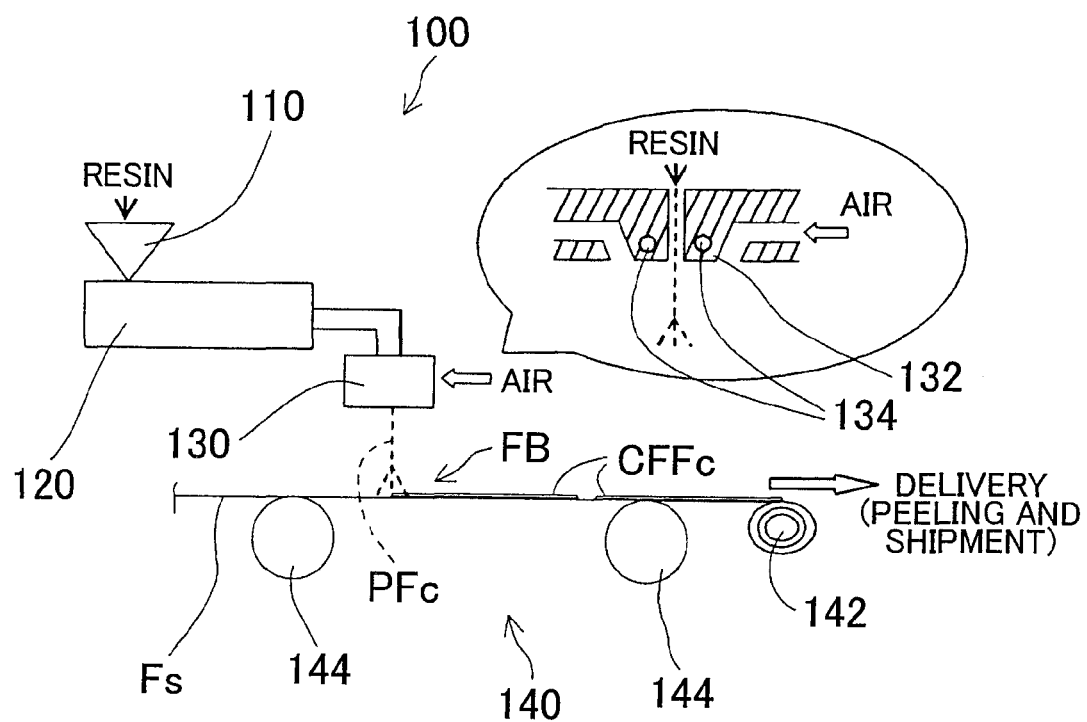
FIG. 3 is an illustrative view schematically showing the configuration of a diffusion layer manufacturing device 100 that is employed to manufacture the gas diffusion layer.

Next, a method of manufacturing the anode-side gas diffusion layer 23 and the cathode-side gas diffusion layer 24 that are employed in the aforementioned fuel cell 10, and an evaluation of the performance of the gas diffusion layers will be described in detail. These two gas diffusion layers are manufactured according to the same manufacturing method, and are distinctly used on the anode side and the cathode side. First of all, the manufacturing method will be described. FIG. 2 is a flowchart showing the processing procedure of the method of manufacturing a gas diffusion layer. FIG. 3 is an illustrative view schematically showing the configuration of a diffusion layer manufacturing device 100 that is employed to manufacture a gas diffusion layer.

As shown in FIG. 2, in manufacturing both the gas diffusion layers, namely, the anode-side gas diffusion layer 23 and the cathode-side gas diffusion layer 24, a series of treatments, that is, solutionization of a precursor resin (step S100), the extrusion from extrusion nozzles and spinning (step S110), and the deposition of fibers in the form of a non-woven fabric (step S120) are successively carried out in the diffusion layer manufacturing device 100 of FIG. 3.

The diffusion layer manufacturing device 100 is a melt blow-type extrusion spinning device. As shown in FIG. 3, the diffusion layer manufacturing device 100 is equipped with a resin input portion 110, a resin extrusion portion 120, a nozzle mechanism portion 130, and a woven fabric portion 140. When a precursor resin that changes into carbon fibers CF by being subjected to treatments to later-described graphitization, for example, a powdery raw material such as pitch, polyacrylonitrile, rayon, phenol resin or the like is input to the resin input portion 110, the resin input portion 110 filters and dries the powder with a predetermined mesh, and supplies the resin extrusion portion 120 with the powdery raw material whose particle size has been adjusted. The resin extrusion portion 120 heats and solutionizes the precursor resin of the supplied powdery raw material, and supplies the nozzle mechanism portion 130 with a solution of the precursor resin (a precursor resin solution) (step S100). In this case, the viscosity of the precursor resin solution and the like are adjusted.

The nozzle mechanism portion 130 extrudes the supplied precursor resin solution from the extrusion nozzles 132 to spin the fibers of the precursor resin. In spinning the fibers of the precursor resin, the nozzle mechanism portion 130 blows air to nozzle tips of the extrusion nozzles 132 so as to harden the resin. Thus, the fibers of the precursor resin are extruded in the form of sliver from the nozzle mechanism portion 130, more specifically, from the extrusion nozzles 132 toward a filter element sheet Fs of the woven fabric portion 140, and precursor resin fibers PFc are spun (step S110). The extrusion nozzles 132 of the nozzle mechanism portion 130 are equipped with nozzle temperature adjustment portions 134 respectively. Each of these nozzle temperature adjustment portions 134 changes the temperature of a corresponding one of the extrusion nozzles 132 by, for example, adjusting the circulation flow rate and temperature of coolant in a circulation system (not shown) including the extrusion nozzles 132 and adjusting the generation of heat by a heater (not shown) that heats the nozzles. That is, while the nozzle temperature of the extrusion nozzles 132 is raised and lowered repeatly, the extrusion nozzles 132 extrude the precursor resin solution to spin the fibers.

Figure 4:
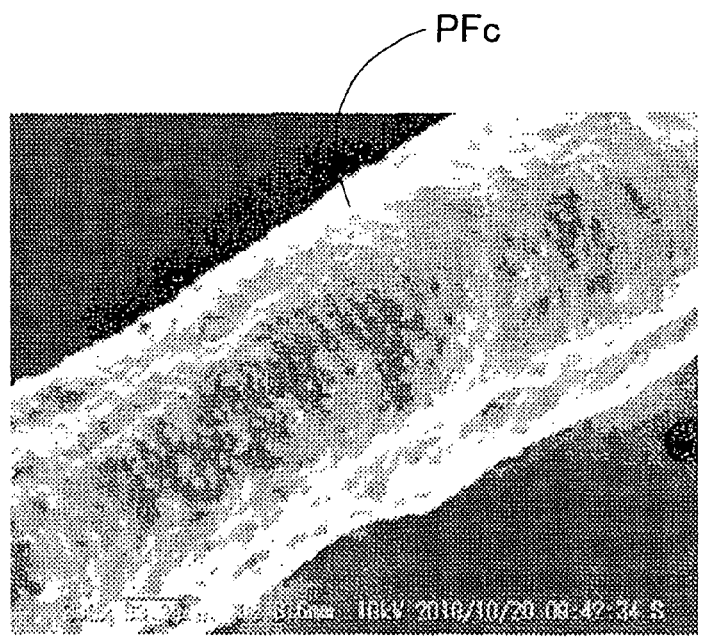
FIG. 4 is an electron micrograph showing a precursor resin fiber PFc that has been extruded from each extrusion nozzle 132 and spun while repeatedly raising and lowering the temperature of a nozzle.

This adjustment of the nozzle temperature is carried out under the control from a controller (not shown) that belongs to the diffusion layer manufacturing device 100. FIG. 4 is an electron microgram of each of the precursor resin fibers PFc that have been extruded from the extrusion nozzles 132 and spun while raising and lowering the nozzle temperature. As shown in FIG. 4, in this embodiment of the invention, the precursor resin fiber is extruded and spun while adjusting the nozzle temperature, whereby the surface of the precursor resin fiber PFc is imparted with irregularities. These irregularities are formed on the surface of the precursor resin fiber PFc by setting the nozzle temperature high or low when the precursor resin fiber is extruded and spun. The degree of irregularities or the frequency of emergence of irregularities can be adjusted by adjusting the difference between high and low nozzle temperatures and the changes in the nozzle temperature between high and low temperatures. In this case, the blowing of air to the nozzle tip also has an influence on the formation of irregularities on the surface of the fiber. Therefore, it is also advantageous to adjust the flow rate of blown air. As shown in FIG. 4, each carbon fiber has irregularities that are perpendicular to the direction of the carbon fiber. Therefore, the carbon fibers are prevented from sliding with respect to one another.

The aforementioned adjustment of the nozzle temperature to high and low temperatures can be carried out according to various methods. For example, in the case where pitch is used as the precursor resin, the nozzle temperature may be repeatedly raised and lowered within an arbitrary temperature range between a temperature higher than a softening temperature (110 to 300° C.) at which the pitch starts fusing and 1000° C. The precursor resin fibers PFc having irregularities on the surfaces thereof can be extruded and spun through this adjustment of the nozzle temperature. If the precursor resin fibers PFc are extruded from the extrusion nozzles 132 and spun with the nozzle temperature held constant, the precursor resin fibers PFc that have no irregularities or only extremely small irregularities on the fiber surfaces thereof and are generally circular in cross-section can be extruded and spun.

The woven fabric portion 140 is equipped with a wind-up roller 142 and a pair of auxiliary rollers 144. The filter element sheet Fs is wound up by the wind-up roller 142, and is thereby retained between the auxiliary rollers 144 with a predetermined tension applied thereto. Then, the woven fabric portion 140 turns the upper face of the filter element sheet Fs to which the tension is applied into a woven fabric portion FB. The filter element sheet Fs adsorbs a surplus solvent or the like from fibers that have been spun toward the woven fabric portion FB or fibers that are being woven in the woven fabric portion FB.

The nozzle mechanism portion 130 is equipped with the extrusion nozzles 132 that are aligned in a row in the direction perpendicular to the sheet of FIG. 3. The nozzle mechanism portion 130 moves the extrusion nozzles 132, which are aligned in a row, from the back side of the sheet toward the front side of the sheet, and from upstream toward downstream in the lateral direction in FIG. 3, namely, in the direction of conveyance. The nozzles are thus moved in various directions with respect to the filter element sheet Fs. Then, the extrusion nozzles 132 extrude the precursor resin solution to the filter element sheet Fs of the woven fabric portion FB to spin the fibers in accordance with such two-dimensional movements of the nozzles, and the filter element sheet Fs moves in a delivery direction shown in FIG. 3. Therefore, the spun fibers are deposited in the form of a nonwoven fabric on the woven fabric portion FB (step S120).

Figure 5:
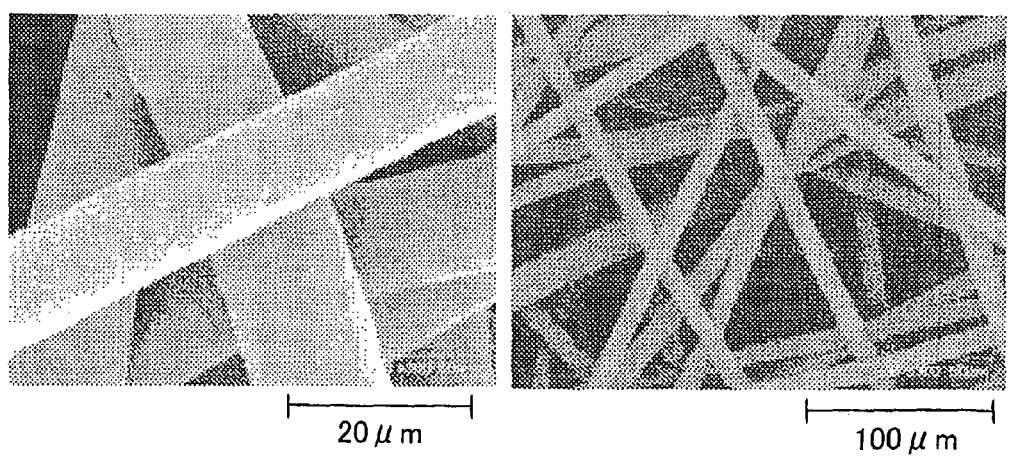
FIG. 5 includes electron micrograms showing an obtained diffusion layer intermediate product CFFc as viewed from a surface layer side thereof with different magnifications.

The nozzle mechanism portion 130 repeats the extrusion from the extrusion nozzles 132 and spinning at intervals of a predetermined span. In each span, therefore, while the spun fibers are deposited in the form of a nonwoven fabric, the deposition spots in the form of a nonwoven fabric extend like a sheet. Thus, a sheet-like diffusion layer intermediate product CFFc having the spun fibers deposited in the form of a nonwoven fabric is obtained on the upper face of the filter element sheet Fs (step S130). FIG. 5 includes electron micrograms of the obtained diffusion layer intermediate product CFFc as viewed from the surface layer side with different magnifications. The left electron microgram in this FIG. 5 is an image of fiber intersecting regions in the right electron microgram on an five-times enlarged scale. As shown in FIG. 5, the obtained diffusion layer intermediate product CFFc has the precursor resin fibers PFc deposited in the form of a nonwoven fabric. In this case, if the magnification is further enhanced, it is depicted how the individual precursor resin fibers PFc constituting the diffusion layer intermediate product CFFc have the already-mentioned irregularities on the fiber surfaces thereof (see FIG. 4). This diffusion layer intermediate product CFFc is delivered downstream together with the filter element sheet Fs, and is peeled before the wind-up roller 142. This peeled diffusion layer intermediate product CFFc is subjected to subsequent infusibilization, carbonization, and graphitization. In this state, the irregularities of the carbon fibers can be, for example, generally hemispherical with a diameter that is equal to or larger than 3 μm and equal to or smaller than 30 μm. The number of irregularities per fiber surface area can be set to 0.0005 to 0.05/μm².

Figure 6:
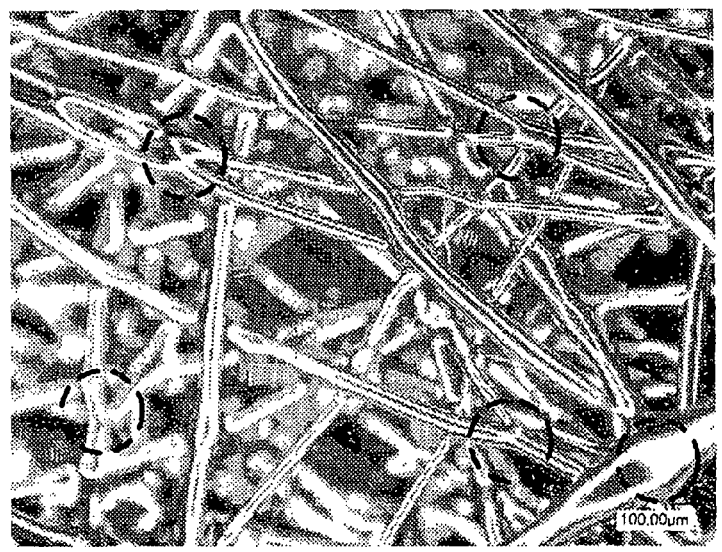
FIG. 6 is an electron micrograph showing the diffusion layer intermediate product CFFc subjected to an infusibilization treatment as viewed from the surface layer side thereof.

The obtained diffusion layer intermediate product CFFc is transported into an infusibilization furnace (not shown), and is subjected to an infusibilization treatment in a batch manner (step S140). Infusibilization can be carried out according to various methods such as oxidation by oxygen, oxidation condensation, dehydrogenation condensation and the like. In this embodiment of the invention, when this infusibilization is carried out, the infusibilization of the used precursor resin has not been completed. For example, in the case where pitch is used as the precursor resin, infusibilization is carried out under an environment whose temperature is lower than a temperature of 250 to 400° C. at which infusibilization of the pitch can be completed. Alternatively, infusibilization is carried out at this temperature in a time shorter than 100 to 1000 min in which infusibilization of the pitch can be completed. FIG. 6 is an electron microgram of the aforementioned diffusion layer intermediate product CFFc subjected to the infusibilization treatment as viewed from the surface layer side. As shown in FIG. 6, in the infusibilized diffusion layer intermediate product CFFc, the fibers are fused to one another at spots where the precursor resin fibers PFc intersect with one another or are superimposed on one another or at spots where the fiber ends are in contact with the surrounding fibers. These fusion spots are indicated by dotted lines in FIG. 6. Heat is likely to concentrate at the spots where the fibers intersect with one another or are superimposed on one another or at the spots where the fiber ends are in contact with the surrounding fibers. Therefore, in the aforementioned infusibilization as well, the fibers are fused to one another. This fusion occurs in the raw material resin itself of the precursor resin fibers PFc (the precursor resin of the carbon fibers CF). Therefore, the aforementioned fusion regions assume the same graphite structure as the carbon fibers CF after carbonization and graphitization that will be described later.

Figure 7:
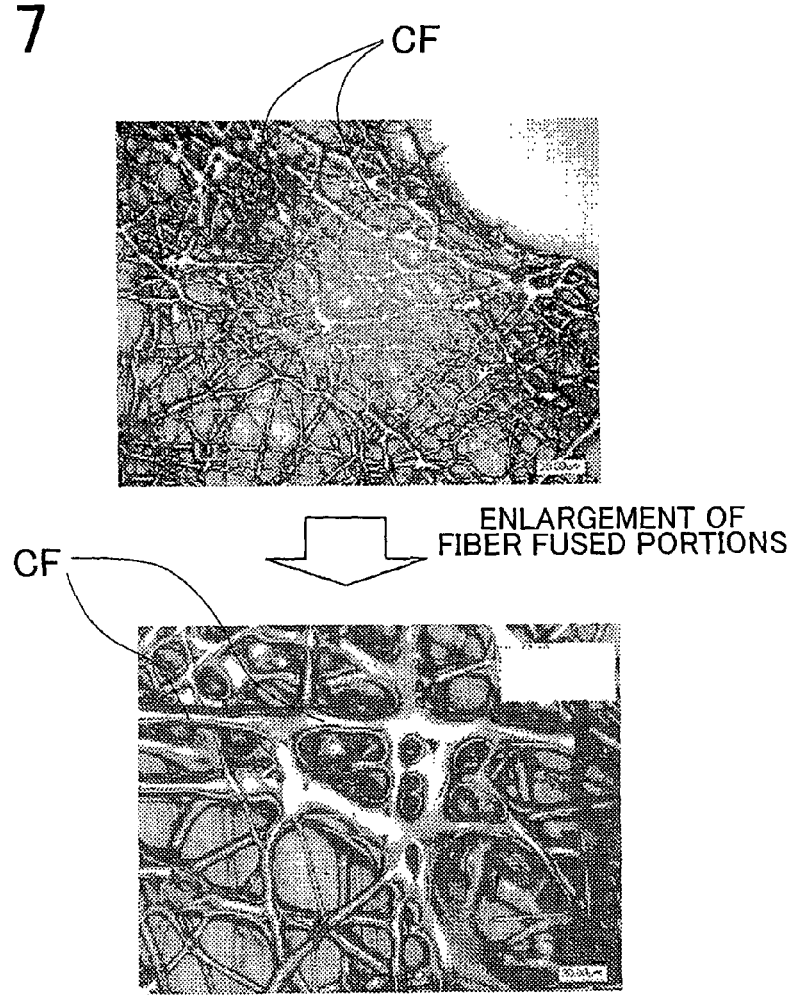
FIG. 7 includes electron micrograms showing the gas diffusion layer as a final product obtained after being cooled and hardened, as viewed from the surface layer side thereof.

The aforementioned diffusion layer intermediate product CFFc subjected to infusibilization is transported into a carbonization furnace (not shown), and is subjected to a carbonization treatment in a batch manner under an inactive gas environment (step S150). This carbonization treatment is not different from an existing carbonization treatment for carbonizing the used precursor resin, but is identical in carbonization temperature, heat-up speed, carbonization treatment time and the like to an existing method. After the carbonization treatment, the treatment temperature in the carbonization furnace is raised to a graphitization treatment temperature, whereby the diffusion layer intermediate product CFFc is subjected to the graphitization treatment in a batch manner under an inactive gas environment. Alternatively, the carbonized diffusion layer intermediate product CFFc is transported into a graphitization furnace (not shown), is subjected to a graphitization treatment in a batch manner under an inactive gas environment (step S160). Then, the graphitized diffusion layer intermediate product CFFc is cooled and hardened (step S170). The aforementioned graphitization treatment may be an existing graphitization treatment. The graphitization temperature, temperature increasing rate, treatment time and the like of the graphitization treatment may be same as those of an existing method. The precursor resin fibers PFc constituting the infusibilized diffusion layer intermediate product CFFc change into the carbon fibers CF via carbonization of step S150 and graphitization of step S160 while having irregularities on the fiber surfaces. In consequence, after the diffusion layer intermediate product CFFc is cooled and hardened, extremely thin sheet-like gas diffusion layers having the carbon fibers CF, which have irregularities on the fiber surfaces thereof, deposited in the layer thickness direction are obtained, and are distinctly used as the anode-side gas diffusion layer 23 and the cathode-side gas diffusion layer 24. FIG. 7 includes electron micrograms of a gas diffusion layer as a final product obtained after being cooled and hardened, as viewed from the surface layer side thereof. It is confirmed that the carbon fibers CF, including the regions fused through the aforementioned infusibilization, have been graphitized in the electron microgram as well as during observation with the naked eye. Besides, so-called fluff resulting from the protrusion of the tips of the carbon fibers CF from the surface layer of the gas diffusion layer has not been observed both during observation with the naked eye and during fingertip examination. This means that the tips of the carbon fibers CF have come into contact with the surrounding carbon fibers CF and have been fused, bound thereto and then graphitized.

As shown in FIG. 1, the obtained anode-side gas diffusion layer 23 and the obtained cathode-side gas diffusion layer 24 are attached to the anode 21 of the MEA, are sandwiched together with the MEA by the gas separators 25 and 26, and constitute each of the single cells 15 and hence the fuel cell 10.

Figure 8A:
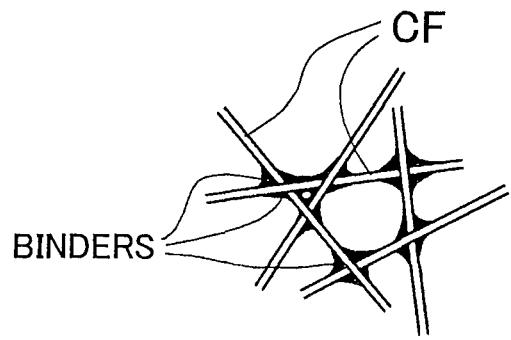
FIG. 8A is an illustrative planar view schematically showing how carbon fibers CF constituting a gas diffusion layer of a comparative example are bound to one another.
Figure 8B:
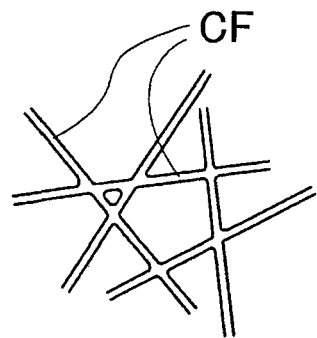
FIG. 8B is an illustrative planar view schematically showing how carbon fibers CF constituting a gas diffusion layer of the embodiment of the invention are bound to one another.
Figure 9A:
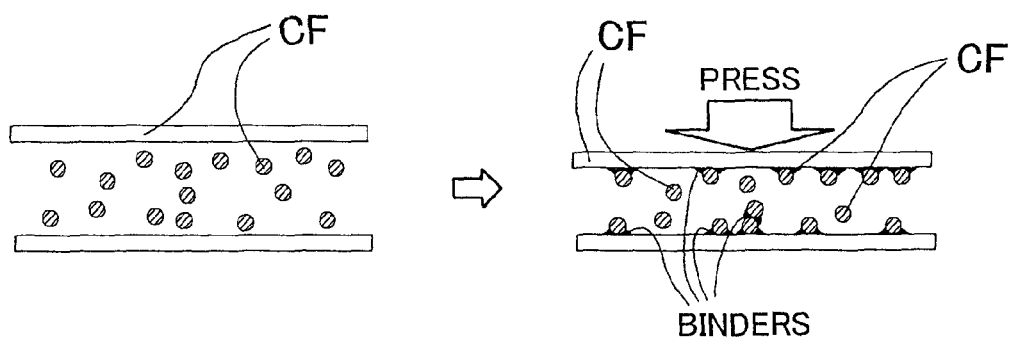
FIG. 9A is an illustrative lateral view schematically showing the process in which the carbon fibers CF end up being bound to one another in the comparative example.
Figure 9B:
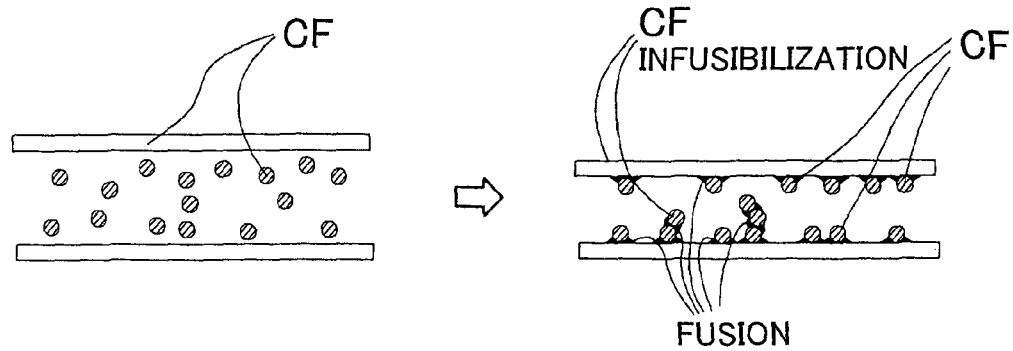
FIG. 9B is an illustrative lateral view schematically showing the process in which the carbon fibers CF end up being bound to one another in the embodiment of the invention.

Next, the evaluation of the performance of the obtained gas diffusion layer will be described. The embodiment whose performance is to be evaluated is the gas diffusion layer manufactured via the aforementioned steps S100 to S170 (no binder is used in this embodiment of the invention). A comparative example is an existing gas diffusion layer having the graphitized carbon fibers CF bound to one another by binders and deposited in the layer thickness direction. FIG. 8A is an illustrative planar view schematically showing how carbon fibers CF constituting a gas diffusion layer of a comparative example are bound to one another. FIG. 8B is an illustrative planar view schematically showing how carbon fibers CF constituting a gas diffusion layer of the embodiment of the invention are bound to one another. As shown in FIGS. 8A and 8B, while the carbon fibers CF are bound to one another at the intersecting spots thereof by the binders in the comparative example, the carbon fibers CF are graphitized and bound to one another at the intersecting spots thereof via fusion of the precursor resin of the carbon fibers CF in the embodiment of the invention. This binding occurs as follows. FIG. 9A is an illustrative lateral view schematically showing the process in which the carbon fibers CF end up being bound to one another in the comparative example. FIG. 9B is an illustrative lateral view schematically showing the process in which the carbon fibers CF end up being bound to one another in the embodiment of the invention. FIGS. 9A and 9B schematically show how the carbon fibers CF extend from the front side of the sheet to the back side of the sheet between the upper and lower carbon fibers CF in the drawing, and intersect with one another.

As shown in FIG. 9A, in the comparative example, when the carbon fibers CF are bonded, a contact pressure is applied to the carbon fibers CF by a press so as to reduce the thickness of the layer. When the carbon fibers CF come into contact with one another or become close to one another upon receiving this contact pressure, those spots are bound to one another by the binders. However, the carbon fibers CF that receive no contact pressure or the carbon fibers CF that receive a contact pressure but do not come into contact with the surrounding carbon fibers CF or become close thereto are not bound to one another by the binders but are in a more or less free state. On the other hand, in the embodiment of the invention, the carbon fibers FC are infusibilized (FIG. 2: step S140). In this case, no contact pressure is applied to the carbon fibers FC, more specifically, to the precursor resin fibers PFc by the press. However, the precursor resin fibers PFc are deformed to be expanded, bent, etc. upon receiving heat during infusibilization, change their fiber loci, and come into contact with or become close to the surrounding precursor resin fibers PFc. That is, in the embodiment of the invention, the number of spots where the carbon fibers CF, more specifically, the precursor resin fibers PFc come into contact with or become close to the surrounding fibers increases. At those spots, the fusion of resin occurs, and the fusion spots are graphitized (steps S150 and S160) to securely bind the carbon fibers CF to one another. Also, in the embodiment of the invention, each of the carbon fibers CF has irregularities on the fiber surface thereof as shown in FIG. 4. Therefore, the fibers are in contact with one another on these irregularities, so that the carbon fibers CF are more securely bound to one another with the aforementioned fusion.

Figure 10:
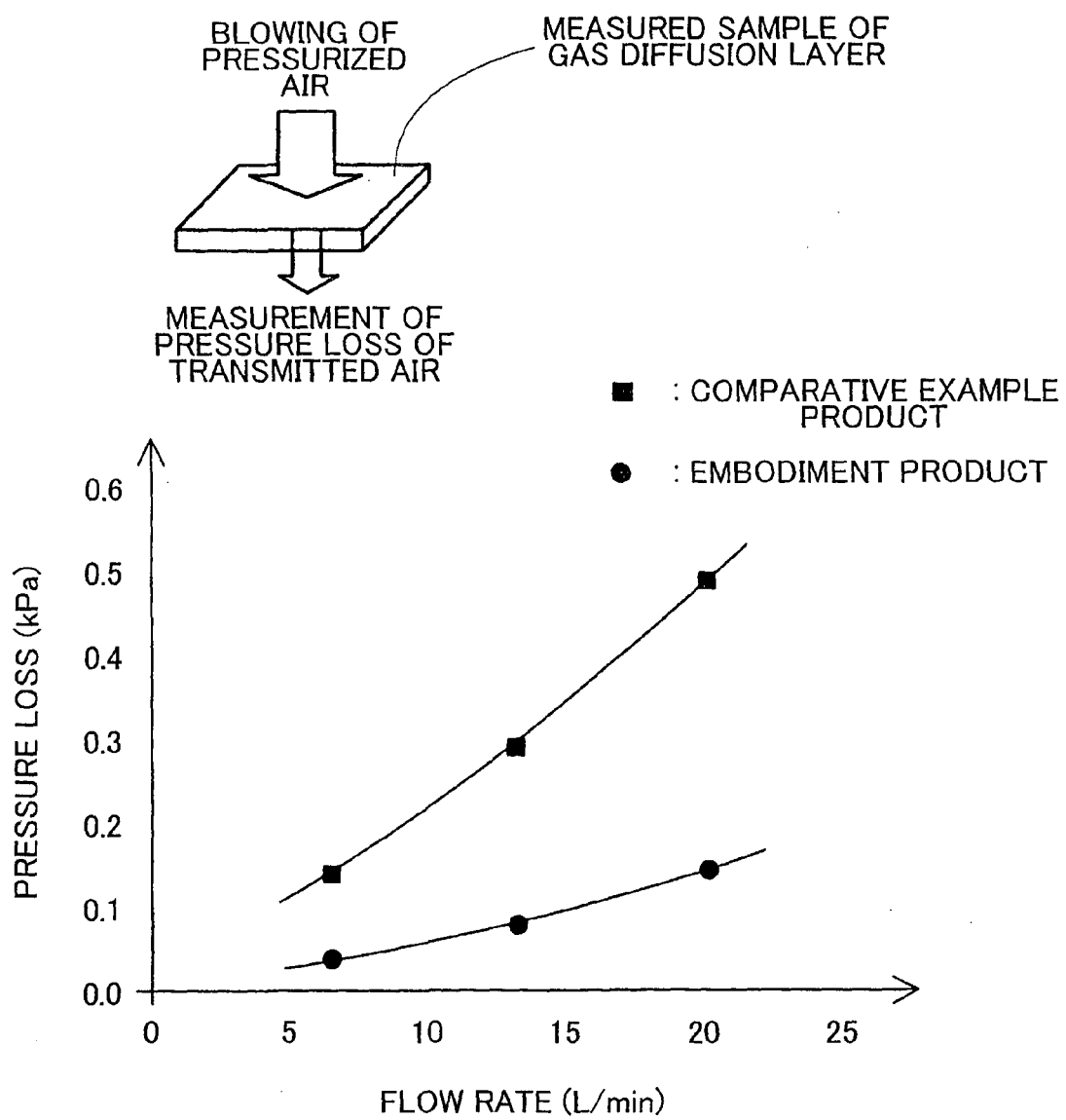
FIG. 10 is an illustrative view showing how the gas permeability of a gas diffusion layer in a layer thickness direction is measured, and a graph obtained by plotting the results of the measurement as to the comparative example and the embodiment of the invention.
Figure 11:
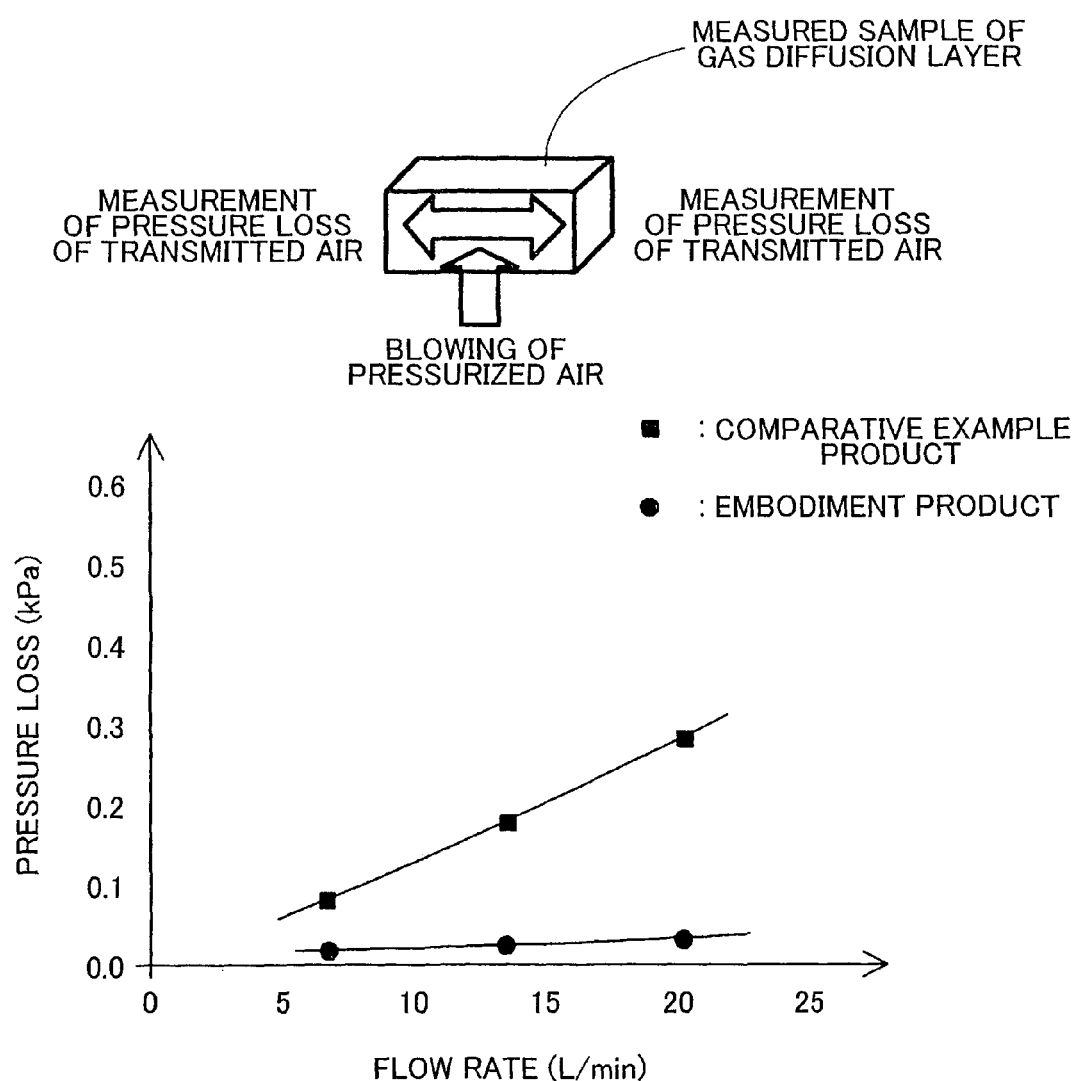
FIG. 11 is an illustrative view showing how the gas permeability within a gas diffusion layer is measured, and a graph obtained by plotting the results of the measurement as to the comparative example and the embodiment of the invention.

Gas permeability was evaluated as to the comparative example and the embodiment of the invention that are different from each other in how the fibers are bound to one another as described above. FIG. 10 is an illustrative view showing how the gas permeability of a gas diffusion layer in a layer thickness direction is measured, and a graph obtained by plotting the results of the measurement as to the comparative example and the embodiment of the invention. FIG. 11 is an illustrative view showing how the gas permeability within a gas diffusion layer is measured, and a graph obtained by plotting the results of the measurement as to the comparative example and the embodiment of the invention. In this case, as for the measurement of gas permeability in the layer thickness direction, the lateral face of the gas diffusion layer was sealed up, and as shown in FIG. 10, pressurized air (1.8 MPa) was blown from one surface of the gas diffusion layer, a pressure loss of the transmitted air was calculated, and the pressure loss was associated with the flow rate of the blown-out pressurized air. As for the measurement of gas permeability in the gas diffusion layer, one surface of the front and back faces of the gas diffusion layer was sealed up, and as shown in FIG. 11, pressurized air (1.8 MPa) was blown from the other surface of the gas diffusion layer, a pressure loss of the transmitted air was calculated, and the pressure loss was associated with the flow rate of the blown-out pressurized air.

As shown in FIGS. 10 and 11, it has turned out that the gas permeability of the embodiment of the invention is about three times as high as the gas permeability of the comparative example over a range ranging from low flow rates to high flow rates. Thus, in the fuel cell 10 having the anode-side gas diffusion layer 23 and the cathode-side gas diffusion layer 24 as the gas diffusion layers of the embodiment of the invention, it is assumed that the diffusivity of gas to the MEA is enhanced and the power generation capacity is enhanced due to high gas permeability in both the gas diffusion layers. Besides, the drainability of produced water is enhanced in the cathode-side gas diffusion layer 24, and the dischargeability of water vapor components contained to humidify gas is enhanced in the anode-side gas diffusion layer 23 as well. Therefore, the possibility of suppressing flooding is assumed to be enhanced, and hence, the startability at low temperatures is also assumed to be enhanced.

As described with reference to FIGS. 8A to 9B, in the embodiment of the invention, the number of spots where the carbon fibers CF come into contact with one another or become close to one another increases, the fusion of resin results from infusibilization at those spots, and the carbon fibers CF are securely bound to one another through graphitization at the fusion spots. Thus, in the embodiment of the invention, the air gaps in the gas diffusion layer formed of the carbon fibers CF are not greatly reduced or blocked up. Therefore, as shown in FIGS. 10 and 11, high gas permeability is obtained when air is blown at high pressure and high flow rate as well. Moreover, each of the carbon fibers CF constituting the gas diffusion layer of the embodiment of the invention has irregularities on the fiber surface thereof. In consequence, even when the carbon fibers CF receive a force, part of a cross-linked structure linking the carbon fibers with one another is destroyed, after the carbon fibers CF come into contact with the surrounding carbon fibers CF upon receiving a force as a result of the reception of a high pressure of blown air, the state of contact is maintained by the irregularities and the carbon fibers CF are unlikely to slip with respect to one another due to an increase in frictional force. From this point of view as well, according to the gas diffusion layer of the embodiment of the invention, high gas permeability is obtained even when air is blown at high pressure and at high flow rate.

Next, the flexure that can serve as an index in suppressing the settling or creeping of the gas diffusion layer will be described. FIG. 12 is an illustrative view showing how the flexibility of a gas diffusion layer is measured, and a graph obtained by plotting the results of the measurement as to the comparative example and the embodiment of the invention. In this measurement of flexure, the following situation is presupposed. As shown in FIG. 1, the anode-side gas diffusion layer 23 and the cathode-side gas diffusion layer 24 abut on the gas separators 25 and 26 respectively. In consequence, as shown in FIG. 12, the gas diffusion layer of the embodiment of the invention and the gas diffusion layer of the comparative example were laid on a jig having a recessed groove that is approximately equal in dimension to the in-cell fuel gas flow channels 47 and the in-cell oxidizing gas flow channels 48 of the separators, a load was applied from above the groove, and an amount of flexure was calculated and associated with the load (a tip contact pressure).

As shown in FIG. 12, the amount of flexure into the groove resulting from the reception of the load is smaller in the embodiment of the invention than in the comparative example. Thus, the phenomenon of settling or creeping is unlikely to occur when the load is continuously received. Thus, in the embodiment of the invention, the layered configuration of the gas diffusion layer can be maintained, or the layered configuration can be restrained from changing. This can be explained as follows. As described with reference to FIGS. 8A to 9B, in the embodiment of the invention, the number of spots where the carbon fibers CF come into contact with one another or become close to one another increases, the fusion of resin results from infusibilization at those spots, and the carbon fibers CF are securely bound to one another through graphitization at the fusion spots.

Figure 14A:
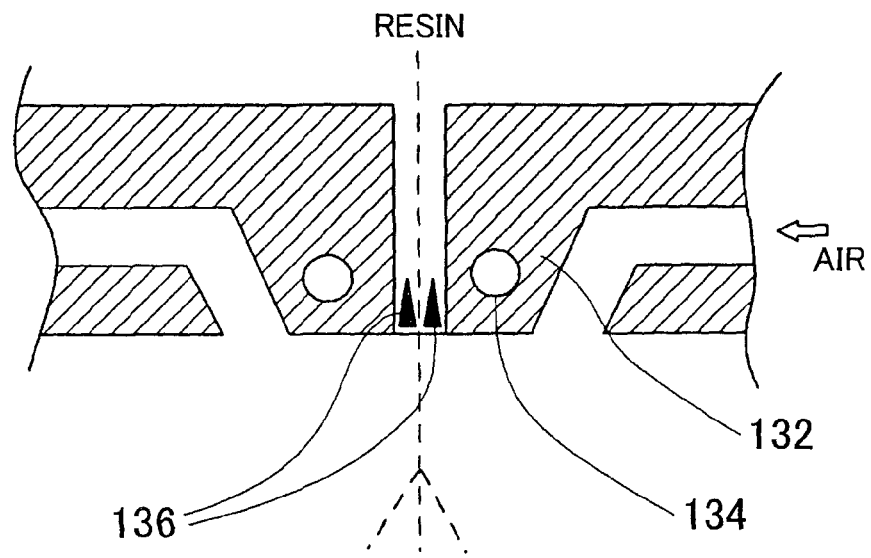
FIG. 14A is an illustrative view schematically showing the configuration of an, extrusion nozzle 132 for obtaining the hollow fiber-type carbon fiber CF according to the modification example.
Figure 14B:
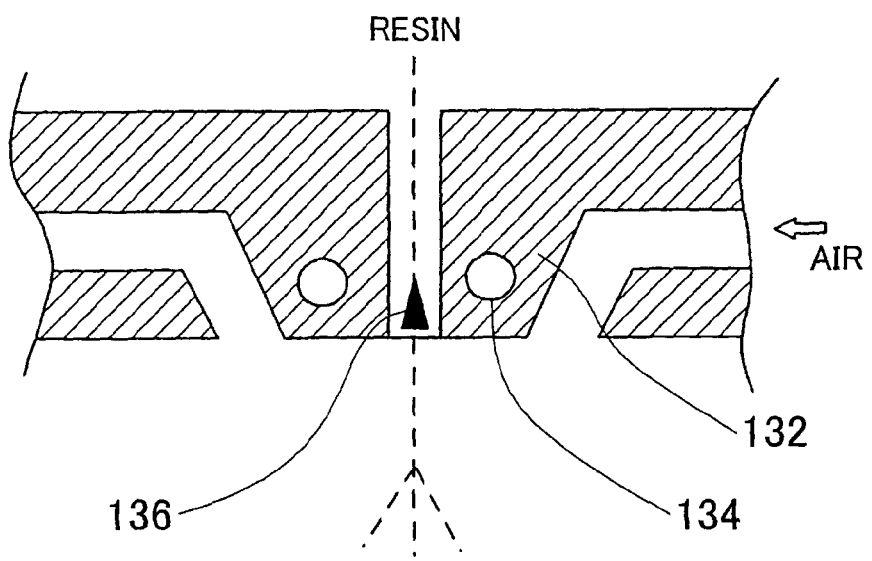
FIG. 14B is an illustrative view schematically showing the configuration of an extrusion nozzle 132 for obtaining the hollow fiber-type carbon fiber CF according to the above another modification example.

Next, a modification example will be described. FIG. 13A is an electron microgram showing an end face of the carbon fiber CF according to a modification example. The carbon fiber CF of this modification example is a hollow fiber (FIG. 13A) having a plurality of hollow portions therein. FIG. 13B is an electron microgram showing an end face of the carbon fiber CF according to another modification example. The carbon fiber CF of this modification example is a hollow fiber (FIG. 13B) having a hollow portion at the center thereof. In order to form gas diffusion layers such as the anode-side gas diffusion layer 23 and the cathode-side gas diffusion layer 24 from the carbon fibers CF as these hollow fibers, the extrusion nozzles 132 that are employed during the extrusion and spinning in the nozzle mechanism portion 130 may be designed as nozzles for spinning hollow fibers. FIG. 14A is an illustrative view schematically showing the configuration of each extrusion nozzle 132 for obtaining the hollow fiber-type carbon fiber CF according to the modification example. FIG. 14B is an illustrative view schematically showing the configuration of each extrusion nozzle 132 for obtaining the hollow fiber-type carbon fiber CF according to the above another modification example. In order to obtain a hollow fiber having a plurality of hollow portions therein (FIG. 13A), each of the extrusion nozzles 132 is designed as a nozzle having a resin extrusion hole in which a plurality of extrusion regulation pieces 136 are arranged (FIG. 14A). In order to obtain a hollow fiber having a hollow portion at the center thereof (FIG. 13B), each of the extrusion nozzles 132 is designed as a nozzle having a resin extrusion hole at the center of which an extrusion regulation piece 136 is arranged (FIG. 14B). Then, when the precursor resin solution is extruded from the extrusion nozzles 132, each of which has the extrusion regulation pieces 136 or the extrusion regulation piece 136 as described above, to spin the fibers, the precursor resin fibers PFc, which have irregularities on the fiber surfaces thereof as a result of changes in the nozzle temperature as described already and have been made hollow by the extrusion regulation pieces 136, are extruded and spun. The precursor resin fibers PFc thus spun are subjected to the processing starting from step S120 of FIG. 2, whereby the anode-side gas diffusion layer 23 and the cathode-side gas diffusion layer 24 that have the carbon fibers CF, which are hollow fibers and have irregularities on the fiber surfaces thereof, deposited in the layer thickness direction can be obtained.

In this modification example, the carbon fibers CF are hollow fibers. Therefore, the carbon fibers CF themselves, which constitute the gas diffusion layers, can exert spring properties for a force in the fiber diameter reduction direction. In consequence, in the gas diffusion layer that is formed of the carbon fibers CF that are equipped with irregularities on the surfaces thereof and designed as hollow fibers, the effectiveness in maintaining the layered configuration of the gas diffusion layer or restraining the layered configuration from changing can be further enhanced. Moreover, since gas and water flow through the hollow portions inside the carbon fibers CF, an advantage is obtained in ensuring the diffusivity of gas and the drainability of water as well.

In the foregoing modification example, the size or arrangement of the extrusion regulation pieces 136 is changed to set the porosity of the carbon fibers CF, which are equipped with irregularities on the surfaces thereof, equal to or higher than 30%. Thus, the spring properties can be highly effectively exerted, and the diffusivity of gas and the drainability of water can' also be enhanced. In addition, the porosity of the carbon fibers CF that are equipped with irregularities on the surfaces thereof is set equal to or lower than 50%. Therefore, the shape of the carbon fibers CF as hollow fibers can be maintained, and the undesired settling of the gas diffusion layer can be avoided. In addition, the hollow portions of the carbon fibers CF exert adiabaticity. Therefore, in the single cell 15 having the anode-side gas diffusion layer 23 and the cathode-side gas diffusion layer 24 according to this modification example, and hence in the fuel cell 10, the power generation performance can be restrained from deteriorating under a low-temperature environment.

FIG. 15 is an illustrative view showing the process of manufacturing the diffusion layer intermediate product CFFc according to another modification example. In this modification example, the diffusion layer intermediate product CFFc has a double-layer structure. As shown in FIG. 15, the diffusion layer intermediate product CFFc is obtained as the double-layer diffusion layer intermediate product CFFc by forming a first diffusion layer intermediate product CFFc1 and a second diffusion layer intermediate product CFFc2 on respective first woven fabric portions FB1 and FB2 and then laminating them on a second woven fabric portion FB2. Each of this first diffusion layer intermediate product CFFc1 and this second diffusion layer intermediate product CFFc2 is obtained by extruding the precursor resin solution from a corresponding one of a first extrusion nozzle 1321 and a second extrusion nozzle 1322 to spin the fibers, and depositing them in the form of a nonwoven fabric. The first extrusion nozzle 1321 extrudes the precursor resin solution to spin the fibers with the nozzle temperature unchanged, or extrudes the precursor resin solution to spin the fibers with the difference between the lowest temperature and the highest temperature of the nozzle and the cycle of time of changes in the nozzle temperature reduced. Thus, the precursor resin fibers PFc extruded from the first extrusion nozzle 1321 to spin the fibers do not have irregularities on the fiber surfaces thereof or have small irregularities on the fiber surfaces thereof, and form the first diffusion layer intermediate product CFFc1. On the other hand, the second extrusion nozzle 1322 extrudes the precursor resin solution to spin the fibers with the nozzle temperature raised and lowered in the same manner as the already-described extrusion nozzles 132. Therefore, the precursor resin fibers PFc are equipped, on the fiber surfaces thereof, with irregularities that are larger than those of the precursor resin fibers PFc obtained from the first extrusion nozzle 1321. The second diffusion layer intermediate product CFFc2 is formed. The first diffusion layer intermediate product CFFc1 thus obtained and the second diffusion layer intermediate product CFFc2 thus obtained are superimposed on each other on the second woven fabric portion FB2, whereby the diffusion layer intermediate product CFFc of a double-layer structure is obtained.

This diffusion layer intermediate product CFFc of a double-layer structure is subjected to subsequent infusibilization, carbonization, and graphitization to become a gas diffusion layer having the carbon fibers CF deposited in the layer thickness direction. This gas diffusion layer formed of the carbon fibers CF also reflects the situation of the fiber surfaces of the precursor resin fibers PFc prior to a change into the carbon fibers CF. Thus, the carbon fibers CF constituting the surface layer portion of one of the gas diffusion layers that is equivalent to the first diffusion layer intermediate product CFFc1 are not equipped with irregularities on the fiber surfaces thereof, or are equipped with only small irregularities on the fiber surfaces thereof. On the other hand, the carbon fibers CF constituting the surface layer portion of the other gas diffusion layer that is equivalent to the second diffusion layer intermediate product CFFc2 are equipped with irregularities on the fiber surfaces thereof. That is, the gas diffusion layer formed from the diffusion layer intermediate product CFFc according to this modification example has the carbon fibers CF on the surfaces of which the irregularities are in different situations (sizes of the irregularities and/or the number of the irregularities), on the front and back of the diffusion layer. One of the front and back of the diffusion layer is not equipped with irregularities on the fiber surfaces thereof, or are equipped with only small irregularities on the fiber surfaces thereof. Each of the single cells 15 that employs the anode-side gas diffusion layer 23 and the cathode-side gas diffusion layer 24, which are formed from the diffusion layer intermediate product CFFc according to this modification example, has the following advantage.

In each of the single cells 15 shown in FIG. 1, each of the anode-side gas diffusion layer 23 and the cathode-side gas diffusion layer 24 is configured such that the surface layer side thereof that is equivalent to the first diffusion layer intermediate product CFFc1 is attached to a corresponding one of the anode 21 and the cathode 22 of the MEA. Then, as shown in FIG. 15, the carbon fibers CF that do not have irregularities on the fiber surfaces thereof or have only small irregularities on the fiber surfaces thereof are attached to the anode 21 and the cathode 22. Thus, the anode 21, the cathode 22, and the electrolyte membrane 20 can be prevented from being mechanically damaged due to the attaching of the irregularities on the surfaces of the carbon fibers to the MEA. Thus, the durability of the MEA, and hence the durability of the single cells 15 and the fuel cell 10 can be enhanced.

Figure 16:
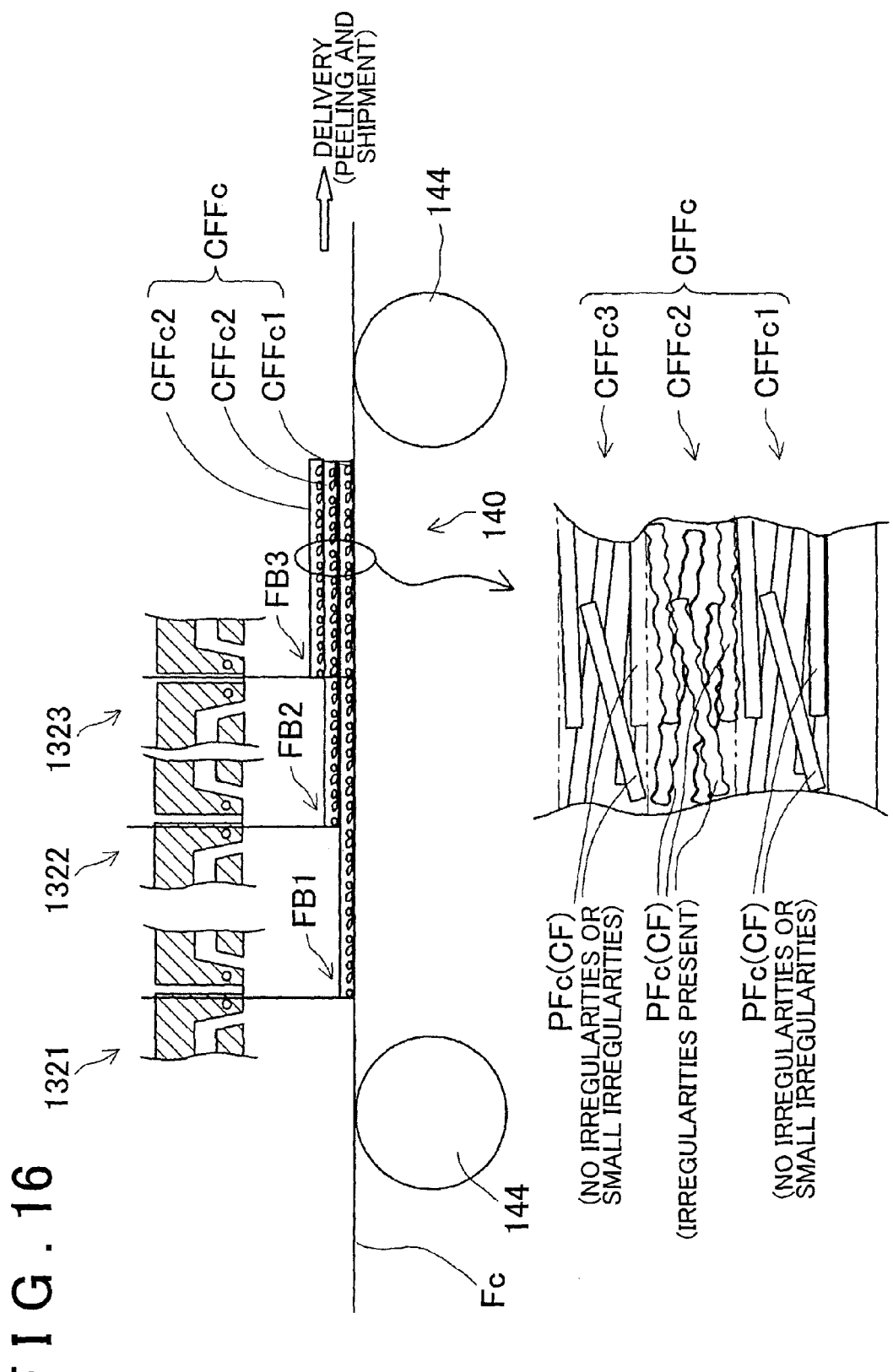
FIG. 16 is an illustrative view showing the process of manufacturing the diffusion layer intermediate product CFFc according to still another modification example.

FIG. 16 is an illustrative view showing the process of manufacturing the diffusion layer intermediate product CFFc according to still another modification example. In this modification example, the diffusion layer intermediate product CFFc has a triple-layer structure. As shown in FIG. 16, the diffusion layer intermediate product CFFc according to the modification example is obtained as the triple-layer diffusion layer intermediate product CFFc by forming the first diffusion layer intermediate product CFFc1, the second diffusion layer intermediate product CFFc2, and a third diffusion layer intermediate product CFFc3 on their respective first woven fabric portions FB1 to FB3 and then laminating them on the second woven fabric portion FB3. Each of this first diffusion layer intermediate product CFFc1 and this second diffusion layer intermediate product CFFc2 is obtained by extruding the precursor resin solution from a corresponding one of the first extrusion nozzle 1321 and the second extrusion nozzle 1322 to spin the fibers, and depositing them in the form of a nonwoven fabric. In this modification example, a third extrusion nozzle 1323 is further provided, and this nozzle is employed to extrude the precursor resin solution to spin the fibers with the nozzle temperature unchanged, or to extrude the precursor resin solution to spin the fibers with the difference between the lowest temperature and the highest temperature of the nozzle and the cycle of time of changes in the nozzle temperature reduced. Thus, in the gas diffusion layer that is obtained via infusibilization, carbonization, and graphitization of the diffusion layer intermediate product CFFc of the triple-layer structure according to this modification example, the irregularities on the fiber surfaces of the carbon fibers CF in a gas diffusion layer region equivalent to the second diffusion layer intermediate product CFFc2, which occupies the inner layer side of the gas diffusion layer, are larger than the irregularities on the fiber surfaces of the carbon fibers CF in gas diffusion layer regions equivalent to the first diffusion layer intermediate product CFFc1 and the third diffusion layer intermediate product CFFc3, which occupy the surface layer side of the front and back of the gas diffusion layer. That is, on the front and back of the gas diffusion layer that is formed from the diffusion layer intermediate product CFFc according to this modification example, the carbon fibers CF are not equipped with irregularities on the fiber surfaces thereof, or are equipped with only small irregularities on the fiber surfaces thereof. Each of the single cells 15 that employs the anode-side gas diffusion layer 23 and the cathode-side gas diffusion layer 24, which are formed from the diffusion layer intermediate product CFFc according to this modification example, has the following advantage.

In each of the single cells 15 shown in FIG. 1, each of the anode-side gas diffusion layer 23 and the cathode-side gas diffusion layer 24 is configured such that the surface layer side thereof that is equivalent to the first diffusion layer intermediate product CFFc1 is attached to a corresponding one of the anode 21 and the cathode 22 of the MEA, and that the surface layer side thereof that is equivalent to the third diffusion layer intermediate product CFFc3 is attached to a corresponding one of the gas separators 25 and 26. Thus, as described already, the anode 21, the cathode 22, and the electrolyte membrane 20 can be prevented from being mechanically damaged due to the attaching of the irregularities on the surfaces of the carbon fibers to the MEA. Moreover, as shown in FIG. 16, the carbon fibers CF that do not have irregularities on the fiber surfaces thereof or have only small irregularities on the fiber surfaces thereof are attached to the gas separators 25 and 26. It is therefore possible to ensure contact with the separators and restrain the contact resistance from increasing. As a result, the gas diffusion layer according to this modification example makes it possible to enhance the power generation capacity of the single cells 15 and hence the power generation capacity of the fuel cell 10 through a reduction in the resistance of contact with the separators.

While the mode of carrying out the invention has been described above, the invention is not limited at all to such a mode of carrying out the invention, but can be carried out in various modes. For example, although the melt blow-type extrusion and spinning are adopted with the aid of the extrusion nozzles 132 in the embodiment of the invention, it is also possible to carry out extrusion and spinning according to an electro-spinning method.

The invention claimed is:

1. A gas diffusion layer for a fuel cell, comprising carbon fibers deposited in a layer thickness direction of the gas diffusion layer, wherein
the gas diffusion layer has three or more layers in each of which the carbon fibers are deposited in the layer thickness direction,
the carbon fibers having irregularities on fiber surfaces thereof, and
the carbon fibers of an inner layer are larger in size or larger in number than the irregularities on the fiber surfaces of the carbon fibers of a surface layer.

2. The gas diffusion layer according to claim 1, wherein the irregularities on the fiber surfaces of the carbon fibers on at least one surface layer side of the gas diffusion layer are smaller in size or smaller in number than the irregularities on the fiber surfaces of the carbon fibers in regions other than the surface layer side.

3. The gas diffusion layer according to claim 1, wherein the carbon fibers are fused to one another at intersecting spots of the carbon fibers.

4. The gas diffusion layer according to claim 1, wherein the carbon fibers include hollow fibers.

5. The gas diffusion layer according to claim 4, wherein a porosity of the hollow fibers is from 30 to 90%.

6. The gas diffusion layer according to claim 1, wherein the irregularities extend in a direction perpendicular to a direction of the carbon fibers.

7. The gas diffusion layer according to claim 6, wherein the irregularities are generally hemispherical with a diameter that is equal to or larger than 3 μm and equal to or smaller than 30 μm.

8. The gas diffusion layer according to claim 1, wherein the irregularities per a unit area of the fiber surface of the carbon fibers range in number from $0.0005/\mu m^2$ to $0.05/\mu m^2$.

9. A fuel cell comprising:
a membrane electrode assembly including an electrolyte membrane and electrodes each of which are attached to both faces of the electrolyte membrane; and
a gas diffusion layer that is attached to the membrane electrode assembly, the gas diffusion layer including carbon fibers deposited in a layer thickness direction of the gas diffusion layer, wherein
the gas diffusion layer has three or more layers in each of which the carbon fibers are deposited in the layer thickness direction,
the carbon fibers having irregularities on fiber surfaces thereof, and
the carbon fibers of an inner layer are larger in size or larger in number than the irregularities on the fiber surfaces of the carbon fibers of a surface layer.

* * * * *